United States Patent [19]
Buchanan et al.

[11] Patent Number: 6,011,346
[45] Date of Patent: Jan. 4, 2000

[54] APPARATUS AND METHOD FOR GENERATING ELECTRICITY FROM ENERGY IN A FLOWING STREAM OF FLUID

[75] Inventors: Ronnie J. Buchanan; Charles A. Butterfield, Jr., both of Duncan, Okla.

[73] Assignee: Halliburton Energy Services, Inc., Duncan, Okla.

[21] Appl. No.: 09/112,867

[22] Filed: Jul. 10, 1998

[51] Int. Cl.[7] .................................................. H01L 41/08
[52] U.S. Cl. ............................................ 310/339; 322/2 R
[58] Field of Search ............................. 310/339; 322/2 R

[56] References Cited

U.S. PATENT DOCUMENTS

| | | | |
|---|---|---|---|
| 1,961,007 | 5/1934 | Marvin | 177/351 |
| 2,709,104 | 5/1955 | Gibbs | 294/65.5 |
| 4,005,319 | 1/1977 | Nilsson et al. | 310/8.3 |
| 4,134,024 | 1/1979 | Wiseman | 290/52 |
| 4,215,426 | 7/1980 | Klatt | 367/83 |
| 4,369,373 | 1/1983 | Wiseman | 290/2 |
| 4,387,318 | 6/1983 | Kolm et al. | 310/330 |
| 4,467,236 | 8/1984 | Kolm et al. | 310/321 |
| 4,491,738 | 1/1985 | Kamp | 290/43 |
| 4,515,225 | 5/1985 | Dailey | 175/40 |
| 4,518,888 | 5/1985 | Zabcik | 310/334 |
| 4,595,856 | 6/1986 | Glomb, Jr. | 310/339 |
| 4,654,537 | 3/1987 | Gaspard | 290/54 |
| 4,669,068 | 5/1987 | Klatt | 367/83 |
| 4,740,711 | 4/1988 | Sato | 249/52 |
| 4,816,697 | 3/1989 | Nalbandyan et al. | 290/54 |
| 5,223,763 | 6/1993 | Chang | 310/339 |
| 5,248,896 | 9/1993 | Forrest | 290/1 R |
| 5,512,795 | 4/1996 | Epstein et al. | 310/339 |
| 5,554,922 | 9/1996 | Kunkel | 322/3 |

FOREIGN PATENT DOCUMENTS

| | | | |
|---|---|---|---|
| 656167 | 4/1979 | Russian Federation | 322/2 R |

*Primary Examiner*—Thomas M. Dougherty
*Attorney, Agent, or Firm*—Craig W. Roddy; C. Clark Dougherty, Jr.

[57] ABSTRACT

Apparatus to generate electricity from energy in a flowing stream of fluid comprises a piezoelectric member and a flow restrictor connected with the member to cause portions of a flowing stream of fluid to flow past different sides of the member such that the member deforms to generate electricity in response thereto. A particular such apparatus includes a conduit to conduct a flowing stream of fluid; a divider disposed along at least a portion of the length of the conduit such that the divider divides that portion of the conduit into two flow channels; a piezoelectric member connected to the divider such that one side of the piezoelectric member is exposed to one of the two flow channels and another side of the piezoelectric member is exposed to the other of the two flow channels; and a flow restrictor disposed at a location between one end of the divider and the other end of the divider. A method comprises: dividing a flowing stream of fluid into two portions and conducting one of the portions along one side of a piezoelectric member and conducting the other of the portions along another side of the piezoelectric member; and restricting one of the portions of flowing fluid relative to the other of the portions of flowing fluid such that a pressure differential is created between the two portions and the piezoelectric member deforms in response to the pressure differential and thereby generates electricity.

21 Claims, 2 Drawing Sheets

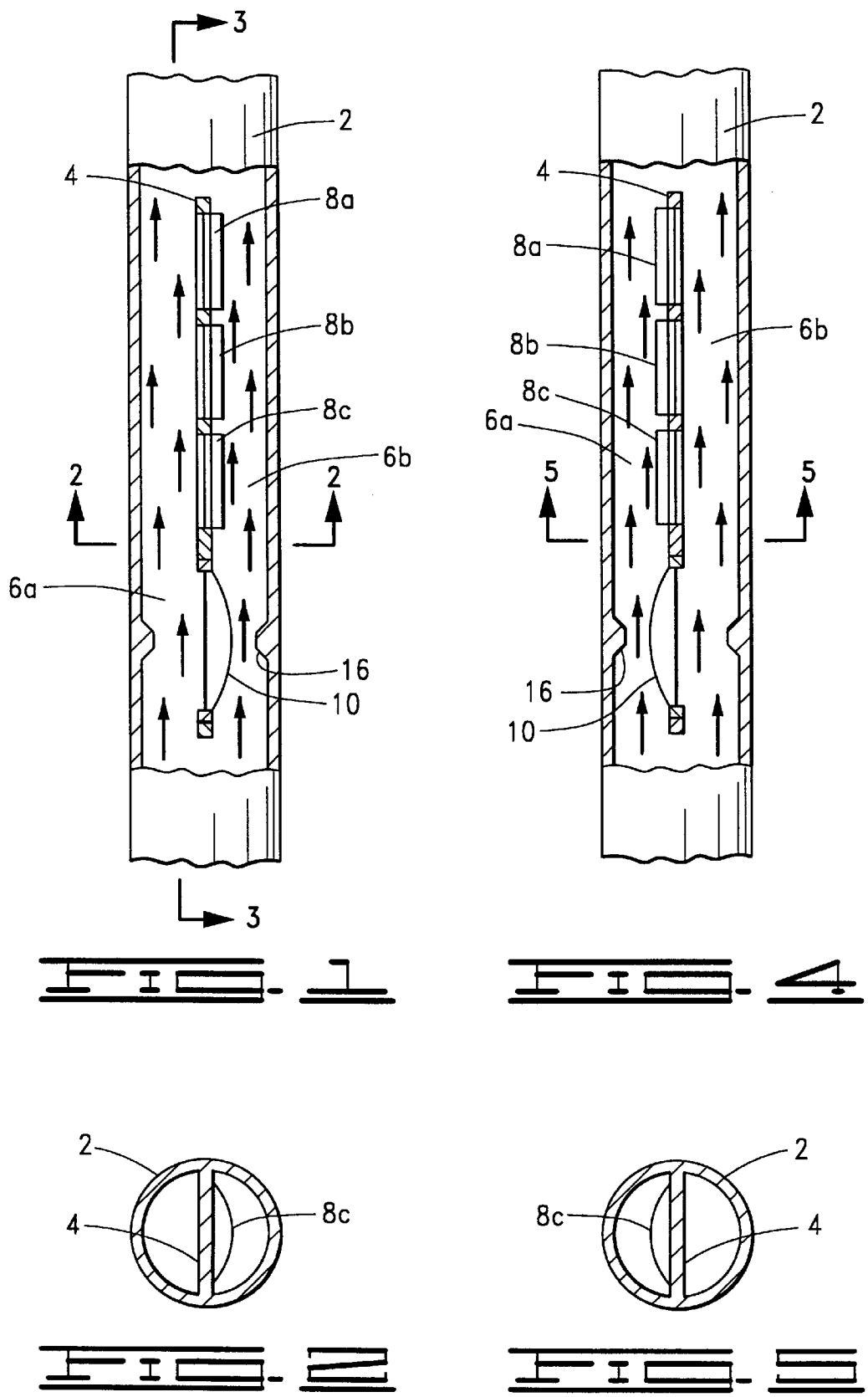

APPARATUS AND METHOD FOR GENERATING ELECTRICITY FROM ENERGY IN A FLOWING STREAM OF FLUID

BACKGROUND OF THE INVENTION

This invention relates to apparatus and methods using one or more piezoelectric members for generating electricity from energy in a flowing stream of fluid. The need for such apparatus and methods has been recognized such as noted in U.S. Pat. No. 4,005,319 to Nilsson et al.; U.S. Pat. No. 4,387,318 to Kolm et al.; U.S. Pat. No. 4,595,856 to Glomb, Jr.; U.S. Pat. No. 5,512,795 to Epstein et al.; and U.S. Pat. No. 5,554,922 to Kunkel. There is still the need for such apparatus and method of an advantageous type suitable for use in-line within a fluid flow path inside a conduit. One specific need is within pipe or tubing in an oil or gas well in which a simple but dependable small power source is needed to power other downhole devices (e.g., a data acquisition device).

SUMMARY OF THE INVENTION

The present invention meets the needs mentioned above by providing a novel and improved apparatus and method for generating electricity from energy in a flowing stream of fluid. The invention can be used in remote or inaccessible locations where a relatively small power source is needed and a fluid is flowing. One example of such a location is in pipe or tubing downhole in an oil or gas well. The invention is simple yet dependable and should not require maintenance once it is placed in operation. The preferred embodiment of the apparatus of the invention has no rotating or sliding parts to wear or bind, but it does include its own moveable device to positively create the conditions within the flowing stream of fluid under which the apparatus is caused to generate electricity.

One definition of the present invention is as apparatus to generate electricity from energy in a flowing stream of fluid, comprising: a piezoelectric member; and a flow restrictor connected with the piezoelectric member to cause portions of a flowing stream of fluid to flow past different sides of the piezoelectric member such that the piezoelectric member deforms to generate electricity in response thereto, wherein the flow restrictor is moveable relative to the piezoelectric member to change the direction of deformation of the piezoelectric member.

Another definition is as apparatus to generate electricity from energy in a flowing stream of fluid, comprising: a piezoelectric member that deforms in response to a pressure differential in a stream of fluid flowing along the piezoelectric member, the deformation of the piezoelectric member occurring in either of two directions transverse to the direction of flow of the fluid; and a flow restrictor that is moveable in the flowing stream of fluid to control in which of the two directions the piezoelectric member deforms.

Still another definition of the present invention is as apparatus to generate electricity from energy in a flowing stream of fluid, comprising: a piezoelectric member adapted to be responsive to fluid flow along two sides thereof; and means for restricting flow along one side of the piezoelectric member relative to flow along another side of the piezoelectric member such that the piezoelectric member deforms to generate electricity in response thereto.

Yet another definition is as apparatus to generate electricity from energy in a flowing stream of fluid, comprising: a conduit to conduct a flowing stream of fluid; a divider disposed along at least a portion of the length of the conduit such that the divider divides that portion of the conduit into two flow channels; a piezoelectric member connected to the divider such that one side of the piezoelectric member is exposed to one of the two flow channels and another side of the piezoelectric member is exposed to the other of the two flow channels; and a flow restrictor disposed at a location between one end of the divider and the other end of the divider.

The apparatus of the present invention can further comprise additional piezoelectric members, each responsive to the operation of the flow restrictor.

The present invention also provides a method of generating electricity from energy in a flowing stream of fluid. This method comprises: dividing a flowing stream of fluid into two portions and conducting one of the portions along one side of a piezoelectric member and conducting the other of the portions along another side of the piezoelectric member; and restricting one of the portions of flowing fluid relative to the other of the portions of flowing fluid such that a pressure differential is created between the two portions and the piezoelectric member deforms in response to the pressure differential and thereby generates electricity. This method can further comprise repeatedly changing which of the portions of flowing fluid is restricted relative to the other portion of flowing fluid such that the piezoelectric member is deformed in different directions to change the polarity of the electricity generated.

Therefore, from the foregoing, it is a general object of the present invention to provide novel and improved apparatus and method for generating electricity from energy in a flowing stream of fluid. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 illustrates a partially cut-away preferred embodiment of the apparatus of the present invention, wherein deformable elements are shown deformed in one state or direction.

FIG. 2 is a sectional view along line 2—2 in FIG. 1.

FIG. 4 illustrates the preferred embodiment of the apparatus of the present invention shown in FIG. 1, but with deformable elements deformed in a different state or direction.

FIG. 6 is a block diagram of an electrical circuit in which parts of the apparatus of FIGS. 1–5 are connected.

DETAILED DESCRIPTION OF THE INVENTION

A preferred embodiment of the apparatus of the present invention is illustrated in FIGS. 1–5. This apparatus generates electricity from energy in a flowing stream of fluid.

Figure 3:
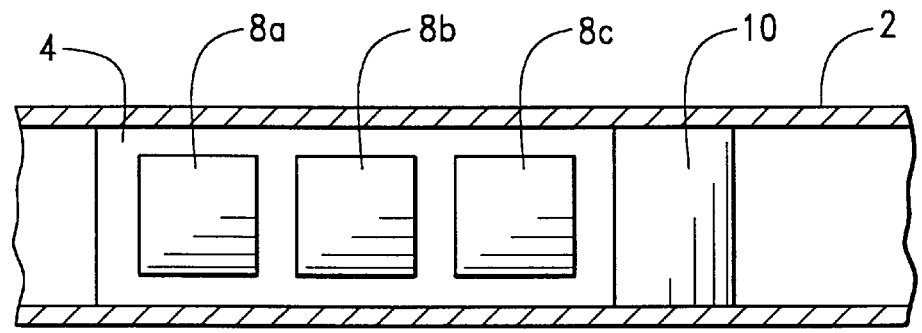
FIG. 3 is a sectional view along line 3—3 in FIG. 1.

Referring first to FIGS. 1–3, the preferred embodiment apparatus comprises a conduit 2 to conduct a flowing stream of fluid. The conduit 2 is of any type suitable for the use to which the apparatus is to be put. The illustrated conduit 2 is a cylindrical pipe suitable for use as part of or with a pipe or tubing string in an oil or gas well.

The illustrated conduit 2 is hollow except for a divider 4. The divider 4 is disposed along at least a portion of the length of the conduit 2 such that the divider 4 divides that portion of the conduit into two flow channels 6a, 6b. The divider 4 is disposed in the conduit such that the two flow channels 6a, 6b do not communicate with each other along the length of the divider 4. The divider 4 as shown in the drawings is in the center of the conduit 2; therefore, this divider extends across an inner diameter of the conduit to segregate the two flow channels 6a, 6b. The divider 4 can be made of the same material as the conduit 2, or it can be made of other suitable material. In a particular implementation, the material or materials of the conduit 2 and divider 4 are selected to be suitable for use in the particular environment in which they are used.

The divider has one or more holes defined through it to receive one or more piezoelectric members. To maintain the flow channel segregation, a respective piezoelectric member is mounted in each hole such that the flowing fluid in one channel does not pass through the divider 4 into the other channel. The apparatus of the present invention comprises one or more such piezoelectric members. Three members 8a, 8b, 8c are shown in the drawings.

Each piezoelectric member 8 is of a type that deforms in response to a pressure differential in a stream of fluid flowing along the piezoelectric member. For the illustrated embodiment, this pressure differential is between flow channels 6a, 6b. In response to a sufficient pressure differential ("sufficient" merely being enough to flex the particular piezoelectric material), the piezoelectric member deforms in either of two directions transverse to the direction of flow of the fluid along the member. To enable this, the respective piezoelectric member 8 is connected to the divider 4 such that one side of the piezoelectric member is exposed to one of the two flow channels 6a, 6b and another side of the piezoelectric member is exposed to the other of the two flow channels. Part of one side of each of the piezoelectric members 8a, 8b, 8c is visible in FIG. 1, and part of the other side of each of the members 8a, 8b, 8c is visible in FIG. 4. In FIG. 1 each member 8a, 8b, 8c is flexed to the right for the illustrated orientation; this direction of flex results from a higher pressure in flow channel 6a than in flow channel 6b. In FIG. 4 each member is flexed to the left for the illustrated orientation; this direction of flex results from a higher pressure in flow channel 6b than in flow channel 6a. Thus each piezoelectric member 8 is adapted to be responsive to fluid flow along two sides thereof.

In the illustrated embodiment, each piezoelectric member 8a, 8b, 8c specifically has two side surfaces disposed parallel to and in contact with the flowing stream of fluid. The side surfaces are transverse to the directions of deformation of the respective piezoelectric member as apparent in FIGS. 1 and 4. One side surface contacts the fluid in the flow channel 6a, and the other side surface contacts the fluid in the flow channel 6b. Also in the illustrated embodiment, each of the piezoelectric members 8a, 8b, 8c is connected to the divider 4 around the outer perimeter of the piezoelectric member; these members 8a, 8b, 8c then flex or deform in response to a pressure differential between the flow channels 6a, 6b.

The pressure differential to which each piezoelectric member 8 responds is actively created by a flow restrictor 10. The flow restrictor 10 is connected relative to the piezoelectric members 8, the conduit 2, and the divider 4 to cause portions from the overall flowing stream of fluid in the undivided portion of the conduit 2 to flow past different sides of the piezoelectric members 8 such that one or more of the piezoelectric members 8 deform to generate electricity in response. In the illustrated embodiment, the flow restrictor 10 is moveable relative to the piezoelectric members 8, as well as relative to the conduit 2 and the divider 4, to change the direction of deformation of the piezoelectric members. Movement of the flow restrictor 10 is controllable to in turn control in which of the two directions the piezoelectric members 8 deform. In the illustrated embodiment, the flow restrictor 10 is disposed at a location between one end of the divider 4 and the other end of the divider 4. This positioning of the flow restrictor 10 restricts flow through one of the two flow channels 6a, 6b relative to flow through the other of the two flow channels, and this restriction can be applied to either of the flow channels because of the adjustability of the flow restrictor of the preferred embodiment. The restriction of one flow relative to the other creates the pressure differential to which the piezoelectric members 8 respond. The flow diversion device provided by the restrictor 10 only needs to deflect enough flow to create a pressure differential sufficient to flex the piezoelectric members.

In the illustrated implementation, the flow restrictor 10 includes a piezoelectric member which is connected to the divider 4 such that one side of this other piezoelectric member is exposed to one of the two flow channels 6a, 6b and another side of this other piezoelectric member is exposed to the other of the two flow channels. Rather than responding to the pressure to generate electricity, this piezoelectric member is deformed by an applied electrical control signal. This member can be the same type as the others, except that it operates in reverse to the others (i.e., electricity is applied to deform it to form the desired restriction, rather than being deformed by a fluid pressure differential to thereby produce electricity).

A piezoelectric member is only one example of flow restrictor 10. In general, the flow restrictor can be any means for restricting flow along one side of each piezoelectric member 8 relative to flow along the other side of the piezoelectric member 8 such that the piezoelectric member 8 deforms to generate electricity in response. Such means can be electrical, mechanical, electromechanical, or as may otherwise be implemented to obtain the requisite relative restriction in the flow channels 6a, 6b. Non-limiting specific examples include mechanical turbines or flapper valves or magnetic devices such as solenoids or TbDyFe compounds; however, the piezoelectric element is preferred because of its simplicity and reliability.

Figure 5:
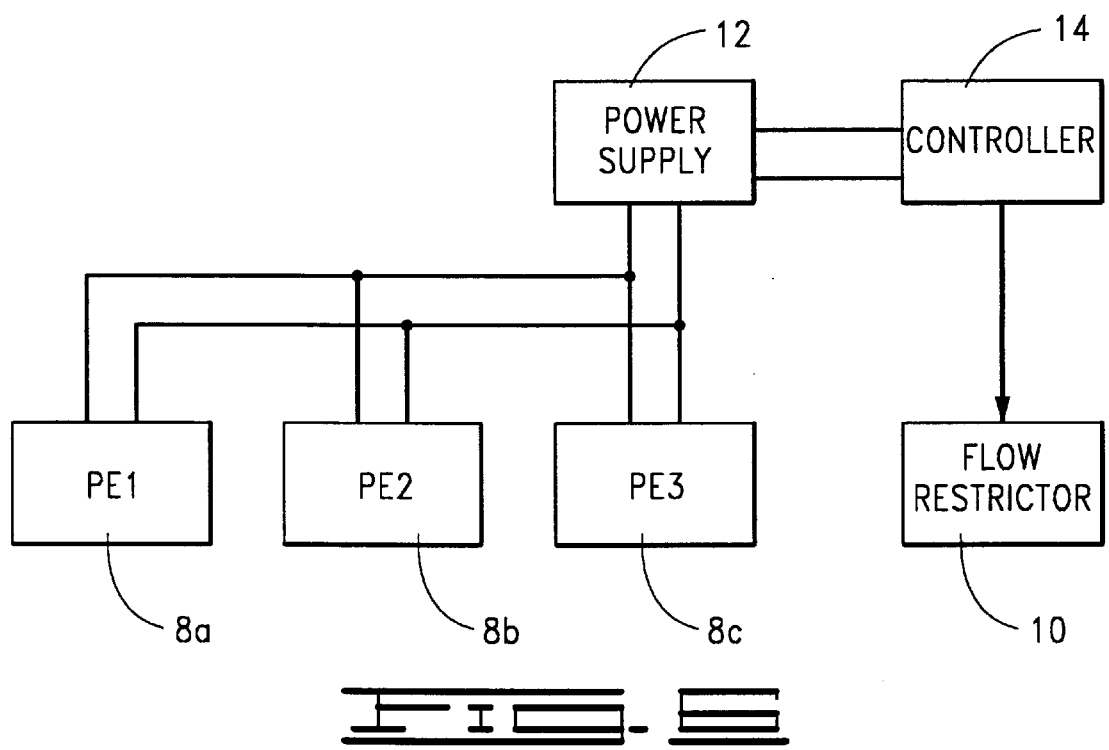
FIG. 5 is a sectional view along line 5—5 in FIG. 4.

As previously referred to, FIG. 1 and corresponding sectional view FIG. 2 illustrate flexed deformation of the piezoelectric members 8, as well as the piezoelectric member of flow restrictor 10, in one direction. Opposite flexure is illustrated in FIGS. 4 and 5.

An electrical circuit not forming part of the present invention, but illustrating use of the invention, is represented in FIG. 6. In FIG. 6 the piezoelectric members 8a, 8b, 8c are connected in electrical parallel to a power supply 12 of any type suitable for storing electrical energy from the members 8 or for otherwise conditioning the electricity from the members 8 for use in powering another circuit (e.g., a downhole data acquisition circuit in an oil or gas well). In the FIG. 6 circuit a controller 14 is used to control the operation/movement of the flow restrictor 10. The controller 14 does not form part of the present invention, but it can be implemented by any suitable means, such as an electronic circuit or mechanical means. It can be electrically powered by the power supply 12, for example.

It is contemplated that the piezoelectric members 8 can be connected to the flow restrictor 10 so that electrical operation of the flow restrictor 10 is energized by part of the output from the piezoelectric members 8. For example, if the flow restrictor 10 is implemented with a piezoelectric member of its own as described above, the output from the members 8 can be connected to reverse the deformation of the piezoelectric member of the flow restrictor 10. This causes this implementation of the flow restrictor 10 to oscillate to create a changing pressure differential between the flow channels 6a, 6b. The small amount of energy necessary to drive this can be taken from the power output of the members 8, leaving a net electrical power gain derived from the energy in the flowing fluid for use by the power supply 12.

The apparatus illustrated in FIGS. 1–5 or other suitable apparatus can be used to perform the method of the present invention for generating electricity from energy in a flowing stream of fluid. The method comprises dividing a flowing stream of fluid into two portions and conducting one of the portions along one side of a piezoelectric member and conducting the other of the portions along another side of the piezoelectric member. Referring to FIG. 1, the flowing fluid entering from the bottom as oriented in the drawing is divided by the divider 4 into two portions, one flowing as indicated by the arrows in channel 6a and the other flowing as indicated by the arrows in channel 6b. Both of these flows move along the respective sides of the piezoelectric members 8.

The method of the present invention further comprises restricting one of the portions of flow relative to the other of the portions of flow such that a pressure differential is created between the two portions and one or more piezoelectric members deform in response to the pressure differential and thereby generate electricity. For the illustrated apparatus, the flow restrictor 10 is located at the beginning of the line of piezoelectric members 8 to form this restriction in conjunction with an annular shoulder 16 defined on the interior surface of the conduit 2; however, the restriction can be anywhere along the flow channels so long as it creates the necessary restricted flow through one of the flow channels 6a, 6b.

In the particular implementation in which a piezoelectric member provides the restriction, it deforms in response to applied electricity to create a small restriction for the flow channel on one side of the piezoelectric members 8. The resulting relatively restricted flow difference between the two channels 6a, 6b causes a pressure differential across the faces of the piezoelectric members 8, which causes the members 8 to bend or compress towards the region of lower pressure. The deformation of the piezoelectric members 8 creates an electrical output that can be used such as illustrated in FIG. 6.

The method can further comprise repeatedly changing which of the portions of flow is restricted relative to the other portion of flow such that the piezoelectric members 8 are deformed in different directions (i.e., first one direction then a second direction) to change the polarity of the electricity generated. After an initial deformation occurs, such as represented in FIG. 1, the flow restrictor 10 is moved in its other direction (e.g., deformed to the position of restrictor 10 in FIG. 2 by reversing the polarity of the electricity applied to the piezoelectric member of such implementation of the flow restrictor 10). This creates a pressure differential in the opposite direction, and this causes the piezoelectric members 8 to flex in the opposite direction, the result of which is represented in FIG. 4. This creates an electrical output of opposite polarity. Cyclical deformation of the piezoelectric members 8 results in an alternating current output that can be used directly, or rectified and stored or used as needed.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. Apparatus to generate electricity from energy in a flowing stream of fluid, comprising:

a piezoelectric member; and a flow restrictor connected with the piezoelectric member to cause portions of a flowing stream of fluid to flow past different sides of the piezoelectric member such that the piezoelectric member deforms to generate electricity in response thereto, wherein the flow restrictor is moveable relative to the piezoelectric member to change the direction of deformation of the piezoelectric member.

2. Apparatus as defined in claim 1, further comprising additional piezoelectric members, each responsive to the operation of the flow restrictor.

3. Apparatus as defined in claim 1, wherein the flow restrictor includes another piezoelectric member.

4. Apparatus as defined in claim 1, wherein the piezoelectric member has two side surfaces disposed parallel to and in contact with the flowing stream of fluid, which side surfaces are transverse to the directions of deformation of the piezoelectric member.

5. Apparatus to generate electricity from energy in a flowing stream of fluid, comprising:

a piezoelectric member that deforms in response to a pressure differential in a stream of fluid flowing along the piezoelectric member, the deformation of the piezoelectric member occurring in either of two directions transverse to the direction of flow of the fluid; and a flow restrictor that is moveable in the flowing stream of fluid to control in which of the two directions the piezoelectric member deforms.

6. Apparatus as defined in claim 5, further comprising additional piezoelectric members, each responsive to the operation of the flow restrictor.

7. Apparatus as defined in claim 5, wherein the flow restrictor includes another piezoelectric member.

8. Apparatus to generate electricity from energy in a flowing stream of fluid, comprising:

a conduit to conduct a flowing stream of fluid;

a divider disposed along at least a portion of the length of the conduit such that the divider divides that portion of the conduit into two flow channels;

a piezoelectric member connected to the divider such that one side of the piezoelectric member is exposed to one of the two flow channels and another side of the piezoelectric member is exposed to the other of the two flow channels; and a flow restrictor disposed at a location between one end of the divider and the other end of the divider.

9. Apparatus as defined in claim 8, further comprising additional piezoelectric members, each responsive to the operation of the flow restrictor, and wherein all the piezoelectric members are connected to the divider and the divider is disposed down the center of the conduit.

10. Apparatus as defined in claim 8, wherein the flow restrictor includes another piezoelectric member.

11. Apparatus as defined in claim 8, wherein the flow restrictor is adjustable to restrict flow through either of the two flow channels relative to flow through the other of the two flow channels.

12. Apparatus as defined in claim 8, wherein the two flow channels do not communicate with each other along the length of the divider.

13. Apparatus as defined in claim 12, wherein the flow restrictor is adjustable to restrict flow through either of the two flow channels relative to flow through the other of the two flow channels.

14. Apparatus as defined in claim 13, wherein the flow restrictor includes another piezoelectric member connected to the divider such that one side of this other piezoelectric member is exposed to one of the two flow channels and another side of this other piezoelectric member is exposed to the other of the two flow channels.

15. Apparatus as defined in claim 14, further comprising additional piezoelectric members, each responsive to the operation of the flow restrictor and each connected to the divider such that one side of each additional piezoelectric member is exposed to one of the two flow channels and another side of each additional piezoelectric member is exposed to the other of the two flow channels.

16. Apparatus to generate electricity from energy in a flowing stream of fluid, comprising:

a piezoelectric member adapted to be responsive to fluid flow along two sides thereof; and means for restricting flow along one side of the piezoelectric member relative to flow along another side of the piezoelectric member such that the piezoelectric member deforms to generate electricity in response thereto.

17. Apparatus as defined in claim 16, further comprising additional piezoelectric members, each responsive to the operation of the means for restricting.

18. Apparatus as defined in claim 16, wherein the means for restricting includes another piezoelectric member.

19. Apparatus as defined in claim 16, wherein the piezoelectric member has two side surfaces disposed parallel to and in contact with a flowing stream of fluid.

20. A method of generating electricity from energy in a flowing stream of fluid, comprising:

dividing a flowing stream of fluid into two portions and conducting one of the portions along one side of a piezoelectric member and conducting the other of the portions along another side of the piezoelectric member; and restricting one of the portions of flowing fluid relative to the other of the portions of flowing fluid such that a pressure differential is created between the two portions and the piezoelectric member deforms in response to the pressure differential and thereby generates electricity.

21. A method as defined in claim 20, further comprising repeatedly changing which of the portions of flowing fluid is restricted relative to the other portion of flowing fluid such that the piezoelectric member is deformed in different directions to change the polarity of the electricity generated.

* * * * *